United States Patent
Kikukawa et al.

(10) Patent No.: US 8,144,561 B2
(45) Date of Patent: Mar. 27, 2012

(54) MULTILAYER OPTICAL RECORDING MEDIUM

(75) Inventors: Takashi Kikukawa, Tokyo (JP); Koji Mishima, Tokyo (JP); Hidetake Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 663 days.

(21) Appl. No.: 11/826,466

(22) Filed: Jul. 16, 2007

(65) Prior Publication Data
US 2008/0049579 A1 Feb. 28, 2008

(30) Foreign Application Priority Data
Aug. 23, 2006 (JP) ................................ 2006-226695

(51) Int. Cl.
*G11B 3/74* (2006.01)
(52) U.S. Cl. ...... 369/94; 369/59.11; 369/100; 369/275.1
(58) Field of Classification Search ............... 369/59.11, 369/94, 275.1, 100
See application file for complete search history.

(56) References Cited

U.S. PATENT DOCUMENTS

| | | | |
|---|---|---|---|
| 7,542,404 B2 | 6/2009 | Yusu et al. | |
| 2002/0197560 A1* | 12/2002 | Ichihara | 430/270.13 |
| 2004/0085874 A1* | 5/2004 | Akiyama et al. | 369/47.53 |
| 2005/0253210 A1* | 11/2005 | Uno et al. | 257/432 |
| 2006/0077869 A1* | 4/2006 | Yusu et al. | 369/275.1 |

FOREIGN PATENT DOCUMENTS

| | | |
|---|---|---|
| JP | A 2005-044512 | 2/2005 |
| JP | A 2006-066071 | 3/2006 |
| JP | A 2006-099893 | 4/2006 |
| WO | WO 2004/027770 A1 | 4/2004 |

OTHER PUBLICATIONS

Mishima K., et al. "150 GB, 6-Layer Write Once Disc for Blu-ray Disc System," Proc. of Optical Data Storage Topical Meeting 2006, pp. 123-125, Apr. 23-26, 2006.
Mishima, K., et al. "Inorganic Write-Once Disc with Quadruple Recording Layers for the Blu-ray Disc System," Proc. of Data Storage Topical Meeting 2003, pp. 48 and 49, May 11-14, 2003.
Habuta, H., et al. "Century Stable Quadruple-Layer BD-R using Te-O-Pd based Films," Proc. of International Symposium on Optical Memory 2006, pp. 14 and 15, Oct. 15-19, 2006.

* cited by examiner

*Primary Examiner* — Wayne Young
*Assistant Examiner* — Linh Nguyen
(74) *Attorney, Agent, or Firm* — Oliff & Berridge, PLC

(57) ABSTRACT

A multilayer recording medium has a three-layered structure for an increased capacity, including an $L_0$ layer, an $L_1$ layer, and an $L_2$ layer in order from the side farthest away from the incident surface of laser light. The recording layers are made of respective recording film materials selected so that the recording films of the recording layers have respective recording-reaction temperatures $T_0$, $T_1$, and $T_2$, where $T_0 \leq T_1 \leq T_2$ and $T_0 < T_2$. This makes the recording sensitivities of the respective recording layers substantially the same and, by extension, the optimal recording powers of the laser light for the respective recording layers substantially the same so that the recording power of the laser light necessary for recording information on the $L_0$ layer in particular is prevented from becoming excessively high.

8 Claims, 2 Drawing Sheets

MULTILAYER OPTICAL RECORDING MEDIUM

BACKGROUND OF THE INVENTION

1. Field of the Invention

The present invention relates to a multilayer optical recording medium having three or more recording layers.

2. Description of the Related Art

Optical recording media such as compact discs (CDs) and digital versatile discs (DVDs) are widely utilized as information recording media. In recent years, attention has also been given to optical recording media that utilize blue or blue violet laser light as the irradiation light so that a larger amount of information can be recorded than that available using convention laser light systems.

Optical recording media are generally classified into three types: a ROM (Read Only Memory) type in which data cannot be recorded or rewritten, an RW (Rewritable) type in which data can be rewritten, and an R (Recordable) type in which data can be recorded only once.

In the R and RW type optical recording media, data is recorded by irradiating a recording layer with laser light to form recording marks that have a reflectivity different from that of surrounding space areas. Data is typically reproduced from an optical recording medium by irradiating a recording layer with laser light and detecting the difference in reflectivity between the recording marks and the space areas with a photodetector.

Such optical recording media can be provided with a plurality of recording layers, therefore resulting in higher recording capacities. When recording data onto an R or RW type optical recording medium that has a plurality of recording layers, the laser light intended for recording can be adjusted and focused upon a target recording layer to be recorded so that the data may be recorded on the target recording layer selectively. Laser light intended for reproduction can also be adjusted and focused upon a target recording layer to be reproduced so that data may be reproduced from the target recording layer selectively. Furthermore, in a multilayer recording medium having three or more recording layers, it is preferable that the recording films of the respective recording layers have extinction coefficients of not higher than 0.5 in view of the transmittance and the recording sensitivity thereof, excluding the $L_0$ layer which is the farthest recording layer from light incident surface and thus need not transmit laser light.

Such R and RW type optical recording media that have a plurality of recording layers are preferably configured so that the recording layers have substantially the same recording sensitivities, and therefore, the optimal recording powers of the laser light for recording information on the respective recording layers are substantially the same.

When a recording layer arranged far from the incident surface of the laser light is irradiated with the laser light, the recording layers lying closer to the incident surface of the laser light than the farthest recording layer from light incident surface cause absorption and reflection. Therefore, the laser light reaches the recording layer with an accordingly lower intensity. The farther the recording layer is, the lower the recording sensitivity becomes. Consequently, when recording information on a recording layer arranged farther, or, in particular, on a recording layer arranged farthest away from the incident surface of the laser light, it is necessary to apply a laser light having a higher recording laser power than that of the laser light used when recording information on recording layers lying closer to the incident surface of the laser light than the recording layer lying farther away. This problem becomes even more profound when the number of layers, or recording layers in particular, is three or more.

SUMMARY OF THE INVENTION

In view of the foregoing problems, various exemplary embodiments of this invention provide an optical recording medium which is multilayered for increased capacity, wherein the optical recording medium recording layers have substantially the same recording sensitivities. Another object of the present invention is, by extension, to make the optimal recording powers of the laser light for the respective recording layers substantially the same so that the recording power of the laser light necessary for recording information on a recording layer arranged farther from the incident surface of the laser light, or, in particular, on a recording layer arranged farthest away from the incident surface of the laser light, is prevented from becoming excessively high.

The inventor has undertaken intensive studies and has found the following. Given a multilayer optical recording medium having three or more recording layers, the recording film materials of the respective recording layers were selected so that the recording film of a recording layer lying farther away from the incident surface of the laser light, between each pair of adjoining recording layers, has a recording-reaction temperature that is lower than or equal to that of the recording film of the recording layer lying closer to the incident surface of the laser light. In addition to this, the recording film materials of the respective recording layers were selected so that the recording film of the recording layer arranged farthest away from the incident surface of the laser light has a recording-reaction temperature that is lower than that of the recording film of the recording layer arranged closest to the incident surface of the laser light. This makes it possible to provide the recording layers with similar recording sensitivities and, by extension, prevent the optimal recording power of the laser light necessary for recording information on a recording layer arranged farther from the incident surface of the laser light, or, in particular, on the recording layer arranged farthest away from the incident surface of the laser light, from becoming excessively high.

The inventor has also found the following. Suppose the film structures of the respective recording layers are formed so that a recording layer lying farther away from the incident surface of the laser light, between each pair of adjoining recording layers, has an absorption higher than or equal to that of the recording layer lying closer to the incident surface of the laser light, with respect to the laser light of the recording wavelength when the recording layer is not multi-layer stacked. Suppose also that the film structures of the respective recording layers are formed so that the recording layer arranged farthest away from the incident surface of the laser light has an absortion higher than that of the recording layer arranged closest to the incident surface of the laser light, with respect to the laser light of the recording wavelength when the recording layer is not multi-layer stacked. In this instance, it is possible to provide recording layers with the same recording sensitivities and, by extension, prevent the optimal recording power of the laser light necessary for recording information on a recording layer arranged farther from the incident surface of the laser light, or, in particular, the recording layer that is arranged farthest away from the incident surface of the laser light, from becoming excessively high.

In summary, the above-described objectives are achieved by the following embodiments of the present invention.

(1) A multilayer optical recording medium comprising three or more recording layers of an $L_0$ layer, an $L_1$ layer, ..., and an $L_{n-1}$ layer in order from a side farthest away from an incident surface of laser light to a side closest to the incident surface of the laser light, wherein the recording layers are each irradiated with the laser light to form recording marks for information recording, and the recording layers are made of respective recording films having respective recording-reaction temperatures of $T_0$, $T_1$, ..., $T_{n-1}$, where $T_0 \leqq T_1 \leqq ... \leqq T_{n-1}$ and $T_0 < T_{n-1}$.

(2) A multilayer optical recording medium comprising three or more recording layers of an $L_0$ layer, an $L_1$ layer, ..., and an $L_{n-1}$ layer in order from a side farthest away from an incident surface of laser light to a side closest to the incident surface of the laser light, wherein the recording layers are each irradiated with the laser light to form recording marks for information recording, and the recording layers in a non multi-layer stacked state have respective absorptions $A_0$, $A_1$, ..., $A_{n-1}$ to the laser light, where $A_0 \geqq A_1 \geqq ... \geqq A_{n-1}$ and $A_0 > A_{n-1}$.

(3) The multilayer recording medium according to claim (1) or (2), wherein the recording films of the respective recording layers excluding the $L_0$ layer have extinction coefficients of not higher than 0.5.

(4) The multilayer recording medium according to any one of (1) to (3), wherein a maximum value and a minimum value of optimal recording powers $P_0, P_1, ..., P_{n-1}$ of the laser light for the respective recording layers have a difference of no greater than 20% of the maximum value thereof.

As employed herein, "the optimal recording powers of the laser light" being "substantially the same" refers to the instance where the maximum value and minimum value of the optimal recording powers of the laser light for the respective recording layers have a difference of no greater than 20% of the maximum value thereof. That is, being "substantially the same" is not limited to the situation where the optimal recording powers of the laser light for the respective recording layers are very the same.

Moreover, ten is assumed to be the maximum of n from the viewpoint of the execution possibility, though n is a positive integer.

According to the present invention, it is possible to achieve a multilayer optical recording medium having three or more recording layers, wherein the recording layers have similar recording sensitivities and therefore the optimal recording powers of the laser light for recording information on the respective recording layers are substantially the same.

DETAILED DESCRIPTION OF THE PREFERRED EMBODIMENTS

A multilayer optical recording medium according to a best mode for carrying out the present invention includes three or more recording layers, namely an $L_0$ layer, an $L_1$ layer, ..., and an $L_{n-1}$ layer in order from a side farthest away from an incident surface of laser light to a side closest to the incident surface of the laser light. The recording layers are each irradiated with the laser light to form recording marks for information recording. The recording films of the recording layers have respective recording-reaction temperatures of $T_0$, $T_1$, ..., $T_{n-1}$ where $T_0 \leqq T_1 \leqq ... \leqq T_{n-1}$ and $T_0 < T_{n-1}$.

A multilayer optical recording medium according to another best mode includes three or more recording layers, namely an $L_0$ layer, an $L_1$ layer, ..., and an $L_{n-1}$ layer in order from a side farthest away from an incident surface of laser light to a side closest to the incident surface of the laser light. The recording layers are each irradiated with the laser light to form recording marks for information recording. The recording layers, when the recording layer is not multi-layer stacked, have respective absorptions $A_0, A_1, ..., A_{n-1}$ to the laser light, where $A_0 \geqq A_1 \geqq ... \geqq A_{n-1}$ and $A_0 > A_{n-1}$.

First Exemplary Embodiment

Figure 1:
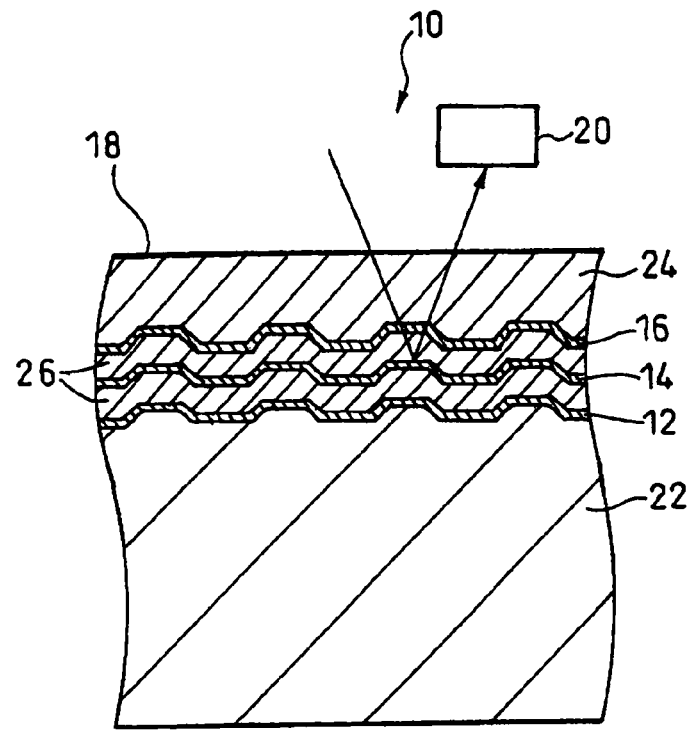
FIG. 1 is a sectional side view schematically showing the overall configuration of a multilayer optical recording medium according to a first exemplary embodiment of the present invention.

Next, a multilayer optical recording medium 10 according to the first exemplary embodiment of the present invention will be described in detail with reference to FIG. 1.

This multilayer optical recording medium 10 has a disc shape with an outer diameter of 120 mm and a thickness of approximately 1.2 mm, and includes a substrate 22, a first recording layer ($L_0$ layer) 12, a second recording layer ($L_1$ layer) 14, and a third recording layer ($L_2$ layer) 16. The $L_0$ layer 12 is formed on the side of the substrate 22 facing toward the incident surface 18 (the top in FIG. 1) of laser light (shown by an arrow in FIG. 1). The $L_1$ layer 14 is arranged closer to the incident surface 18 of the laser light than the $L_0$ layer 12 is. The $L_2$ layer 16 is arranged even closer to the incident surface 18 of the laser light than the $L_1$ layer 14 is. Spacer layers 26 are given between the $L_0$ layer 12 and the $L_1$ layer 14, and between the $L_1$ layer 14 and the $L_2$ layer 16. A light transmitting layer 24 is formed on the $L_2$ layer 16 at the incident side of the laser light.

The substrate 22 has a thickness of approximately 1.1 mm. A concavo-convex pattern for making grooves is formed on the side facing toward the light transmitting layer 24. It should be appreciated that the term "grooves" typically refers to concave portions to be used for data recording and reproduction. As employed herein, however, convex portions protruding toward the light transmitting layer 24 will also be conveniently referred to as "grooves," as long as they are intended for data recording and reproduction. The substrate 22 may be made of materials such as polycarbonate resins, acrylic resins, epoxy resins, polystyrene resins, polyethylene resins, polypropylene resins, silicone resins, fluorine-based resins, ABS resins, urethane resins, and glass. Various metals may also be used if the substrate is not required to transmit laser light.

The light transmitting layer 24 has a thickness, for example, in the range of 30 to 150 μm. The light transmitting layer 24 may be made of energy ray curing resins that have light transparency, such as ultraviolet curing acrylic resins and ultraviolet curing epoxy resins. In this instance, the term "energy rays" shall collectively refer to electromagnetic waves and particle beams, such as ultraviolet rays and electron rays, having the property of curing certain types of fluid resins. The light transmitting layer 24 may be formed by applying a fluid resin onto the substrate and irradiating same with energy rays used for curing. Alternatively, a light transparent film fabricated in advance may be pasted onto the substrate.

The spacer layers 26 have a thickness, for example, in the range of approximately 5 to 90 μm. The same concavo-convex groove pattern as that of the substrate 22 is formed on both sides of such. Like the light transmitting layer 24, the spacer layers 26 may be made of energy ray curing resins that have light transparency, such as ultraviolet curing acrylic resins and ultraviolet curing epoxy resins.

The $L_0$ layer 12 is formed in a concavo-convex pattern according to the concavo-convex pattern of the substrate 22. The $L_1$ layer 14 and the $L_2$ layer 16 are also formed in a concavo-convex pattern according to that of the spacer layers 26.

A description will now be given of the structures of the respective recording layers.

The $L_0$ layer 12 was made of recording film materials of Si and Cu, being formed by depositing a Si layer and a Cu layer. The Cu layer was located on the substrate 22 side, and the Si layer was located on the light transmitting layer 24 side.

Both the Si layer and the Cu layer that form the $L_0$ layer 12 had a thickness of 6 nm. Dielectric layers consisting of a mixture of ZnS and $SiO_2$ (with a molar mixing ratio of ZnS:$SiO_2$=80:20) were formed on both sides of the Si layer and the Cu layer. Each dielectric layer had a thickness of 40 nm. A reflective layer made of an AgPdCu alloy was also given between the substrate 22 and the dielectric layer on the substrate 22 side of the $L_0$ layer 12. The reflective layer had a thickness of 100 nm.

The $L_1$ layer 14 was made of a recording film material of $BiO_{2.45}$. The $BiO_{2.45}$ layer had a thickness of 30 nm. Dielectric layers made of $TiO_2$ were formed on both sides of the $BiO_{2.45}$ layer. These dielectric layers had a thickness of 13 nm each.

The $L_2$ layer 16 was made of a recording film material of $PtO_{1.8}$. The $PtO_{1.8}$ layer had a thickness of 40 nm.

In summary, the recording film materials of the respective recording layers were configured such that the $L_0$ layer: Si/Cu; the $L_1$ layer: $BiO_{2.45}$; and the $L_2$ layer: $PtO_{1.8}$. Consequently, the recording films of the respective recording layers were given respective recording-reaction temperatures $T_0$, $T_1$, and $T_2$ of $T_0=150°$ C., $T_1=300°$ C., and $T_2=590°$ C.

According to the present exemplary embodiment, the recording-reaction temperatures $T_0$, $T_1$, and $T_2$ of the recording films in the respective recording layers therefore satisfy the relationship of $T_0<T_1<T_2$. The recording-reaction temperatures of the recording films can be measured by depositing structures including the recording film materials (in the present exemplary embodiment, Si/Cu, $BiO_{2.45}$, and $PtO_{1.8}$) on a heat resistant substrate made of Si, glass, or the like, and measuring the same for the temperatures at which the reflectivity or transmittance varies when heated up. Alternatively, various techniques for undertaking thermal analysis such as differential thermal analysis (DTA) and differential scanning calorimetry (DSC) may also be used. If the recording film materials are oxides, thermal desorption spectroscopy (TDS) may also be used to undertake the measurement.

In the present exemplary embodiment, the optimal recording powers for the respective layers were configured such that the $L_0$ layer: 8.4 mW; the $L_1$ layer: 9.6 mW; and the $L_2$ layer: 10.0 mW.

While $T_0<T_1<T_2$ holds in the present exemplary embodiment, it is only essential that $T_0<T_2$. That is, such settings where $T_0=T_1<T_2$ and $T_0<T_1=T_2$ are both applicable. In these cases, adjoining recording layers that are linked with the equal signs are made of the same recording film materials. Nevertheless, it should be appreciated that different film structures can be formed as detailed in the following second exemplary embodiment so that they have similar recording sensitivities when arranged in a multilayer configuration.

Second Exemplary Embodiment

Figure 2:
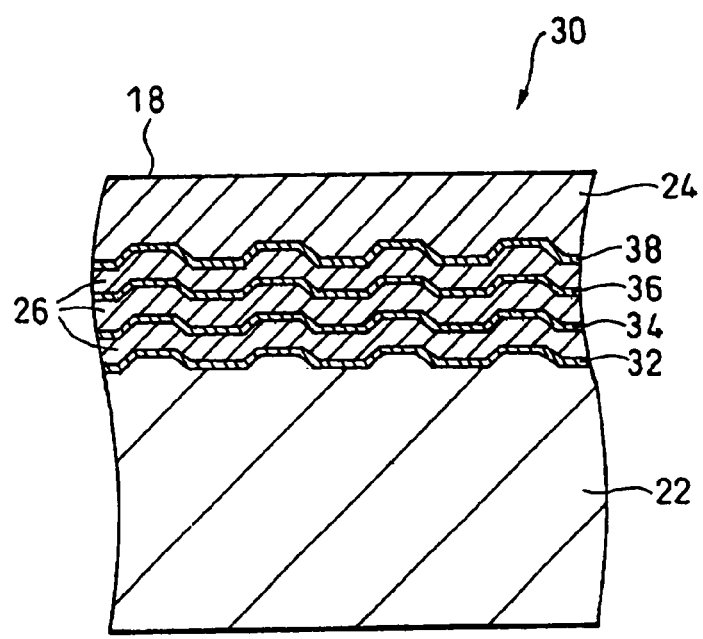
FIG. 2 is a sectional side view schematically showing the overall configuration of a multilayer optical recording medium according to a second exemplary embodiment of the present invention.

Next, a multilayer optical recording medium 30 according to the second exemplary embodiment of the present invention will be described in detail with reference to FIG. 2.

Unlike the multilayer optical recording medium 10 according to the first exemplary embodiment, this multilayer optical recording medium 30 of this exemplary embodiment includes four layers, namely an $L_0$ layer 32, an $L_1$ layer 34, an $L_2$ layer 36, and a fourth recording layer ($L_3$ layer) 38. The rest of the components will be designated by the same reference numerals as in the first exemplary embodiment, and description thereof will be omitted where appropriate.

The $L_0$ layer 32, the $L_1$ layer 34, the $L_2$ layer 36, and the $L_3$ layer 38 are arranged in this order from the substrate 22 to the incident surface 18 of the laser light. Spacer layers 26 are given between the $L_0$ layer 32, the $L_1$ layer 34, the $L_2$ layer 36, and the $L_3$ layer 38, respectively. A light transmitting layer 24 is formed on the $L_3$ layer 38 at the incident side of the laser light.

A description will now be given of the structures of the respective recording layers. The $L_0$ layer 32, the $L_1$ layer 34, the $L_2$ layer 36, and the $L_3$ layer 38 were all made of a recording film material of $BiO_{2.45}$.

The $BiO_{2.45}$ layer of the $L_0$ layer 32 had a thickness of 45 nm. Dielectric layers made of $TiO_2$ were formed on both sides of the $BiO_{2.45}$ layer. These dielectric layers had a thickness of 7 nm each.

The $BiO_{2.45}$ layer of the $L_1$ layer 34 had a thickness of 34 nm. Dielectric layers made of $TiO_2$ were formed on both sides of the $BiO_{2.45}$ layer. These dielectric layers had a thickness of 16 nm each.

The $BiO_{2.45}$ layer of the $L_2$ layer 36 had a thickness of 24 nm. Dielectric layers made of $TiO_2$ were formed on both sides of the $BiO_{2.45}$ layer. These dielectric layers had a thickness of 22 nm each.

The $BiO_{2.45}$ layer of the $L_3$ layer 38 had a thickness of 20 nm. Dielectric layers made of $TiO_2$ were formed on both sides of the $BiO_{2.45}$ layer. These dielectric layers had a thickness of 25 nm each.

Consequently, the recording layers, when the recording layer is not multi-layer stacked, had respective absorptions $A_0$, $A_1$, $A_2$, and $A_3$ of $A_0=20.0\%$, $A_1=15.6\%$, $A_2=13.1\%$, and $A_3=11.0\%$ with respect to the laser light of recording wavelength. In the present exemplary embodiment, the absorptions $A_0$, $A_1$, $A_2$, and $A_3$ of the respective non multi-layer stacked recording layers with respect to the laser light of recording wavelength satisfy the relationship of $A_0>A_1>A_2>A_3$. These absorptions can be measured, for example, using an ellipsometer, spectroscope, or the like.

In the present exemplary embodiment, the optimal recording powers were configured such that the $L_0$ layer: 9.8 mW; the $L_1$ layer: 10.0 mW; the $L_2$ layer: 9.6 mW; and the $L_3$ layer: 10.0 mW.

While the relationship of $A_0>A_1>A_2>A_3$ holds in the present exemplary embodiment, it is only essential that $A_0>A_3$. That is, such settings that $A_0=A_1>A_2>A_3$ and $A_0>A_1=A_2>A_3$ are also applicable. In these cases, adjoining recording layers that are linked with the equal signs have the same absorption with respect to the laser light of recording wavelength when the recording layer is not multi-layer stacked. Nevertheless, it should be appreciated that different recording film materials can be selected as detailed in the foregoing first exemplary embodiment so that they have similar recording sensitivities when arranged in a multilayer configuration.

Third Exemplary Embodiment

Figure 3:
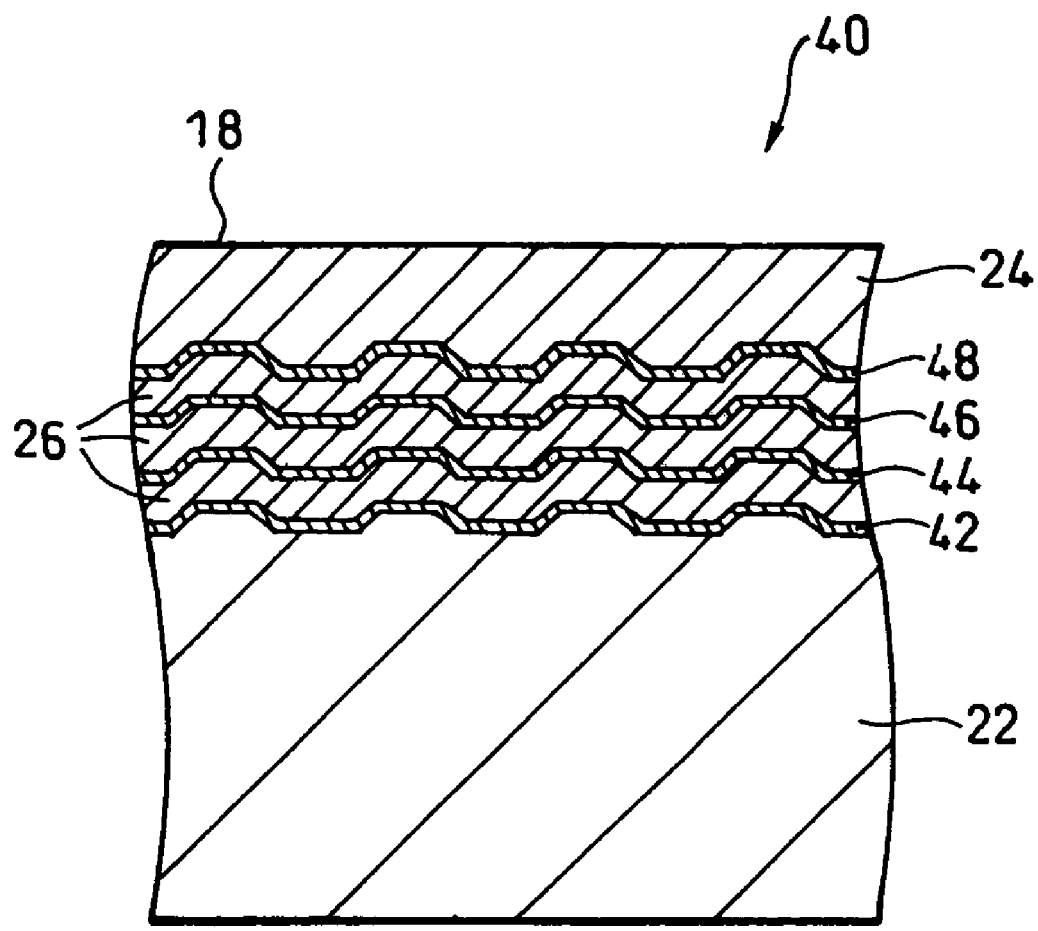
FIG. 3 is a sectional side view schematically showing the overall configuration of a multilayer optical recording medium according to a third exemplary embodiment of the present invention.

Next, a multilayer optical recording medium 40 according to the third exemplary embodiment of the present invention will be described in detail with reference to FIG. 3.

Like the multilayer optical recording medium 30 according to the second exemplary embodiment, this multilayer optical recording medium 40 includes four layers, namely an $L_0$ layer 42, an $L_1$ layer 44, an $L_2$ layer 46, and an $L_3$ layer 48. The rest of the components will be designated by the same reference numerals as in the second exemplary embodiment, and description thereof will be omitted where appropriate.

The $L_0$ layer 42, the $L_1$ layer 44, the $L_2$ layer 46, and the $L_3$ layer 48 are arranged in this order from the substrate 22 to the incident surface 18 of laser light. Spacer layers 26 are given between the $L_0$ layer 42, the $L_1$ layer 44, the $L_2$ layer 46, and the $L_3$ layer 48, respectively. A light transmitting layer 24 is formed on the $L_3$ layer 48 at the incident side of the laser light.

A description will now be given of the structures of the respective recording layers.

The $L_0$ layer 42 was made of recording film materials of Si and Cu, being formed by depositing a Si layer and a Cu layer. The Cu layer was on the substrate 22 side, and the Si layer on the light transmitting layer 24 side.

Both the Si layer and the Cu layer of the $L_0$ layer 42 had a thickness of 6 nm. Dielectric layers composed of a mixture of ZnS and $SiO_2$ (with a molar mixing ratio of $ZnS:SiO_2=80:20$) were formed on both sides of the Si layer and the Cu layer. Each dielectric layer had a thickness of 40 nm. A reflective layer made of an AgPdCu alloy was also given between the substrate 22 and the dielectric layer on the substrate 22 side. The reflective layer had a thickness of 100 nm.

The $L_1$ layer 44 and the $L_2$ layer 46 were made of a recording film material of $BiO_{2.45}$. The $BiO_{2.45}$ layer of the $L_1$ layer 44 had a thickness of 22 nm. Dielectric layers made of $TiO_2$ were formed on both sides of the $BiO_{2.45}$ layer. These dielectric layers had a thickness of 24 nm each.

The $BiO_{2.45}$ layer of the $L_2$ layer 46 had a thickness of 20 nm. Dielectric layers made of $TiO_2$ were formed on both sides of the $BiO_{2.45}$ layer. These dielectric layers had a thickness of 25 nm each.

The $L_3$ layer 48 was made of a recording film material of $PtO_{1.8}$. The $PtO_{1.8}$ layer had a thickness of 40 nm.

In summary, the recording film materials of the respective recording layers were configured such that the $L_0$ layer: Si/Cu; the $L_1$ layer: $BiO_{2.45}$; the $L_2$ layer: $BiO_{2.45}$; and the $L_3$ layer: $PtO_{1.8}$. Consequently, the recording films of the recording layers were given respective recording-reaction temperatures $T_0$, $T_1$, $T_2$, and $T_3$ of $T_0=150°$ C., $T_1=300°$ C., $T_2=300°$ C., and $T_3=590°$ C. According to the present exemplary embodiment, the recording-reaction temperatures $T_0$, $T_1$, $T_2$, and $T_3$ of the recording films in the respective recording layers therefore satisfy the relationship of $T_0<T_1=T_2<T_3$.

The film structures of the $L_1$ layer and the $L_2$ layer had absorptions $A_1$ and $A_2$ of $A_1=12.0\%$ and $A_2=11.0\%$, or $A_1>A_2$, with respect to the wavelength of the laser light when the recording layer is not multi-layer stacked.

In the present exemplary embodiment, the optimal recording powers were configured such that the $L_0$ layer: 10.2 mW; the $L_1$ layer: 10.7 mW; the $L_2$ layer: 11.2 mW; and the $L_3$ layer: 10.0 mW.

COMPARATIVE EXAMPLE 1

With reference to the foregoing first to third exemplary embodiments, a multilayer optical recording medium of a comparative example was fabricated such that the recording films of all the recording layers had the same recording-reaction temperature and all the recording layers, when the recording layer is not multi-layer stacked, had the same absorption with respect to the laser light of recording wavelength.

This multilayer optical recording medium had an $L_0$ layer, an $L_1$ layer, an $L_2$ layer, and an $L_3$ layer. The recording film was $BiO_{2.45}$.

All the recording layers had the same structure. The structure will be described below.

The $BiO_{2.45}$ layers had a thickness of 30 nm. Dielectric layers made of $TiO_2$ were formed on both sides of each of the $BiO_{2.45}$ layers. These dielectric layers had a thickness of 13 nm each.

The optimal recording powers were configured such that the $L_0$ layer: 15.8 mW; the $L_1$ layer: 13.6 mW; the $L_2$ layer: 11.7 mW; and the $L_3$ layer: 10.0 mW.

COMPARATIVE EXAMPLE 2

With reference to the foregoing first exemplary embodiment, a multilayer optical recording medium of another comparative example was fabricated with an inverted order of stacking of the recording layers. In this comparative example, the recording-reaction temperatures $T_0$, $T_1$, and $T_2$ of the recording films in the respective recording layers satisfied the relationship of $T_0>T_1>T_2$. The optimal recording powers in this comparative example were configured such that the $L_1$ layer: 10.0 mW; and the $L_2$ layer: 4.3 mW. As for the $L_0$ layer, recording even at the upper limit of the measuring instrument, or 16.0 mW, failed to provide sufficient characteristics. The optimal recording power thereof is thus considered to be higher than 16 mW.

COMPARATIVE EXAMPLE 3

With reference to the foregoing second exemplary embodiment, a multilayer optical recording medium of still another comparative example was fabricated with an inverted order of stacking of the recording layers. In this comparative example, the absorptions $A_0$, $A_1$, $A_2$, and $A_3$ of the respective non multi-layer stacked recording layers with respect to the laser light of recording wavelength had the relationship of $A_0<A_1<A_2<A_3$. The optimal recording powers in this comparative example were configured such that the $L_1$ layer: 15.0 mW; the $L_2$ layer: 10.1 mW; and the $L_3$ layer: 5.5 mW. As for the $L_0$ layer, recording even at the upper limit of the measuring instrument, or 16.0 mW, failed to provide sufficient characteristics. The optimum recording power thereof is thus considered to be higher than 16 mW.

As above, in any of the multilayer optical recording media according to the first to third exemplary embodiments, the optimum recording powers of laser light for the respective recording layers were substantially the same. The recording power of the laser light necessary for recording information on recording layers arranged farther from the incident surface of the laser light, or, in particular, the recording layer arranged farthest away from the incident surface of the laser light, could thus be prevented from becoming excessively high. That is, the multilayer optical recording media according to the first to third exemplary embodiments could be made so that the recording layers had substantially the same recording sensitivities.

The multilayer optical recording medium of the third exemplary embodiment, or a combination of the first and second embodiments, could also be made so that the recording layers had substantially the same recording sensitivities.

Conversely, in the multilayer optical recording media according to the comparative examples 1 to 3, the optimal recording powers of the laser light for the respective recording layers were not substantially the same. The optimal recording power for the recording layer arranged farthest away from the incident surface of the laser light was excessively high. That is, the multilayer optical recording media according to the comparative examples 1 to 3 had recording layers of significantly different recording sensitivities.

As above, according to the present invention, it is possible to achieve a multilayer optical recording medium including three or more recording layers, wherein the recording layers have substantially the same recording sensitivities, and the optimal recording powers of the laser light for recording information on the respective recording layers are substantially the same.

It should be appreciated that the multilayer optical recording media 10, 30, and 40 according to the first to third exemplary embodiments are of single-sided recording type, having recording layers on one side alone. Nevertheless, the present invention may also be applied to a multilayer optical recording medium of two-sided recording type, having recording layers on both sides.

Moreover, while the multilayer optical recording media 10, 30, and 40 according to the first to third exemplary embodiments are R type optical recording media, the present invention may also be applied to an RW type optical recording medium.

What is claimed is:

1. A multilayer rewritable or recordable type optical recording medium wherein a laser light intended for recording can be adjusted and focused upon a target recording layer to be recorded so that the data may be recorded on the target recording layer selectively comprising:
   three or more recording layers of an $L_0$ layer, an $L_1$ layer, an $L_2$ layer, ..., an Ln-2 layer, and an Ln-1 layer in order from a side farthest away from an incident surface of the laser light to a side closest to the incident surface of the laser light; and
   spacer layers interposed between the $L_0$ layer and the $L_1$ layer, between the $L_1$ layer and the L2 layer, and between the Ln-2 layer and the Ln-1 layer, wherein
   each of the spacer layers has a thickness in the range of approximately 5 to 90 μm,
   the recording layers are each irradiated with the laser light to form recording marks for information recording, and
   the recording layers are made of respective recording films having respective recording-reaction temperatures of T0, T1, ..., Tn-1, where $T0 \leqq T1 \leqq \ldots \leqq Tn-1$ and $T_0 < T_{n-1}$ so that the recording layers have substantially the same recording sensitivities.

2. The multilayer recording medium according to claim 1, wherein
   the recording films of the respective recording layers excluding the $L_0$ layer have extinction coefficients of not higher than 0.5.

3. The multilayer recording medium according to claim 2, wherein
   a maximum value and a minimum value of optimal recording powers $P_0, P_1, \ldots, P_{n-1}$ of the laser light for the respective recording layers have a difference of no greater than 20% of the maximum value thereof.

4. The multilayer recording medium according to claim 1, wherein
   a maximum value and a minimum value of optimal recording powers $P_0, P_1, \ldots, P_{n-1}$ of the laser light for the respective recording layers have a difference of no greater than 20% of the maximum value thereof.

5. A multilayer rewritable or recordable type optical recording medium wherein a laser light intended for recording can be adjusted and focused upon a target recording layer to be recorded so that the data may be recorded on the target recording layer selectively comprising:
   three or more recording layers of an $L_0$ layer, an $L_1$ layer, an $L_2$ layer, ..., an $L_{n-2}$ layer, and an $L_{n-1}$ layer in order from a side farthest away from an incident surface of the laser light to a side closest to the incident surface of the laser light, and
   spacer layers interposed between the $L_0$ layer and the $L_1$ layer, between the $L_1$ layer and the $L_2$ layer, ..., and between the $L_{n-2}$ layer and the $L_{n-1}$ layer, wherein
   each of the spacer layers has a thickness in a range of approximately 5 to 90 μm,
   the recording layers are each irradiated with the laser light to form recording marks for information recording, and
   the recording layers in a non multi-layer stacked state have respective absorptions $A_0, A_1, \ldots, A_{n-1}$ to the laser light, where $A_0 \geqq A_1 \geqq \ldots \geqq A_{n-1}$ and $A_0 > A_{n-1}$ so that the recording layers have substantially the same recording sensitivities.

6. The multilayer recording medium according to claim 5, wherein
   the recording films of the respective recording layers excluding the $L_0$ layer have extinction coefficients of not higher than 0.5.

7. The multilayer recording medium according to claim 6, wherein
   a maximum value and a minimum value of optimal recording powers $P_0, P_1, \ldots, P_{n-1}$ of the laser light for the respective recording layers have a difference of no greater than 20% of the maximum value thereof.

8. The multilayer recording medium according to claim 5, wherein
   a maximum value and a minimum value of optimal recording powers $P_0, P_1, \ldots, P_{n-1}$ of the laser light for the respective recording layers have a difference of no greater than 20% of the maximum value thereof.

* * * * *